United States Patent
Stratton

(10) Patent No.: US 11,840,937 B2
(45) Date of Patent: Dec. 12, 2023

(54) DIFFUSER NOZZLE FOR A GAS TURBINE ENGINE

(71) Applicant: Pratt & Whitney Canada Corp., Longueuil (CA)

(72) Inventor: Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 42 days.

(21) Appl. No.: 17/554,816

(22) Filed: Dec. 17, 2021

(65) Prior Publication Data
US 2023/0193787 A1  Jun. 22, 2023

(51) Int. Cl.
*F01D 25/30* (2006.01)
*F01N 3/24* (2006.01)

(52) U.S. Cl.
CPC .............. *F01D 25/30* (2013.01); *F01N 3/24* (2013.01); *F01N 2470/02* (2013.01); *F01N 2570/14* (2013.01); *F01N 2590/00* (2013.01); *F05D 2220/323* (2013.01); *F05D 2260/609* (2013.01); *F05D 2260/61* (2013.01); *F05D 2270/082* (2013.01)

(58) Field of Classification Search
CPC .......... F05D 2220/32; F02C 6/20; F02K 1/40; F01N 13/1866; F01N 2330/34
See application file for complete search history.

(56) References Cited

U.S. PATENT DOCUMENTS

| | | | | |
|---|---|---|---|---|
| 3,888,332 A | * | 6/1975 | Roe | F01N 1/08 181/268 |
| 4,105,089 A | * | 8/1978 | Judd | F01N 1/10 181/275 |
| 5,198,625 A | * | 3/1993 | Borla | F01N 1/04 181/251 |
| 5,376,341 A | * | 12/1994 | Gulati | F01N 3/2867 422/179 |
| 5,457,290 A | * | 10/1995 | Sase | F01N 3/2885 60/299 |
| 5,829,250 A | * | 11/1998 | Lane | F01N 3/2857 423/213.7 |
| 6,073,857 A | * | 6/2000 | Gordon | F02C 6/18 237/13 |
| 6,866,479 B2 | | 3/2005 | Ishizaka | |

(Continued)

OTHER PUBLICATIONS

EP search report for EP22214757.1 dated Apr. 17, 2023.

*Primary Examiner* — Anthony Ayala Delgado
(74) *Attorney, Agent, or Firm* — GETZ BALICH LLC

(57) ABSTRACT

A diffuser nozzle for a gas turbine engine includes a housing disposed about a nozzle axis and extending between a first nozzle end and a second nozzle end. The housing defines a nozzle duct. A plurality of walls is disposed within the nozzle duct. The plurality of walls subdivides the nozzle duct into a plurality of duct sections. The plurality of walls further defines a plurality of axially-extending duct segments of the nozzle duct such that within a first axially-extending duct segment, the duct cross-sectional area of a first duct section of the plurality of duct sections is greater than the duct cross-sectional area of each other duct section and within a second axially-extending duct segment, the duct cross-sectional area of a second duct section of the plurality of duct sections is greater than the duct cross-sectional area of each other duct section.

20 Claims, 3 Drawing Sheets

(56) References Cited

U.S. PATENT DOCUMENTS

| | | | | |
|---|---|---|---|---|
| 6,878,359 B1* | 4/2005 | Mathes | ............... | B01D 53/8631 |
| | | | | 423/239.1 |
| 7,272,930 B2 | 9/2007 | Wiebe | | |
| 8,516,786 B2* | 8/2013 | Zhang | ................... | F01D 25/305 |
| | | | | 60/39.5 |
| 10,041,377 B2* | 8/2018 | Nanda | ..................... | F01D 25/24 |
| 11,602,736 B2* | 3/2023 | Arshad | ................... | B01J 23/83 |
| 11,603,776 B2* | 3/2023 | O'Donnell | ............. | H02J 1/102 |
| 11,603,852 B2* | 3/2023 | Tawfik | ................. | F04D 29/542 |
| 2002/0095939 A1* | 7/2002 | Gordon | .................... | F02C 3/14 |
| | | | | 60/734 |
| 2003/0054304 A1* | 3/2003 | Karim | .................... | F23C 13/08 |
| | | | | 431/10 |
| 2004/0050618 A1* | 3/2004 | Marocco | ............... | F01N 13/009 |
| | | | | 181/258 |
| 2011/0107763 A1* | 5/2011 | Gordon | .................... | F02C 7/22 |
| | | | | 60/737 |
| 2011/0305611 A1* | 12/2011 | Freeman | ............. | B01J 19/2485 |
| | | | | 422/171 |
| 2013/0086906 A1 | 4/2013 | Thomas | | |
| 2013/0129498 A1 | 5/2013 | Hofmann | | |
| 2014/0353064 A1* | 12/2014 | Trumper | ............... | F01N 3/0222 |
| | | | | 60/311 |
| 2016/0177872 A1 | 6/2016 | Akcayoz | | |
| 2017/0145880 A1* | 5/2017 | Nelson | ...................... | F01N 1/00 |
| 2017/0175640 A1* | 6/2017 | Glessner | ................... | F02C 6/08 |
| 2017/0204771 A1* | 7/2017 | Zhang | ................. | F01N 11/002 |
| 2020/0102856 A1* | 4/2020 | McDeed | ............... | F01N 3/103 |
| 2020/0378275 A1* | 12/2020 | Jo | ........................ | F01D 25/305 |
| 2023/0077677 A1* | 3/2023 | Hayashi | ............... | F01D 25/246 |

* cited by examiner

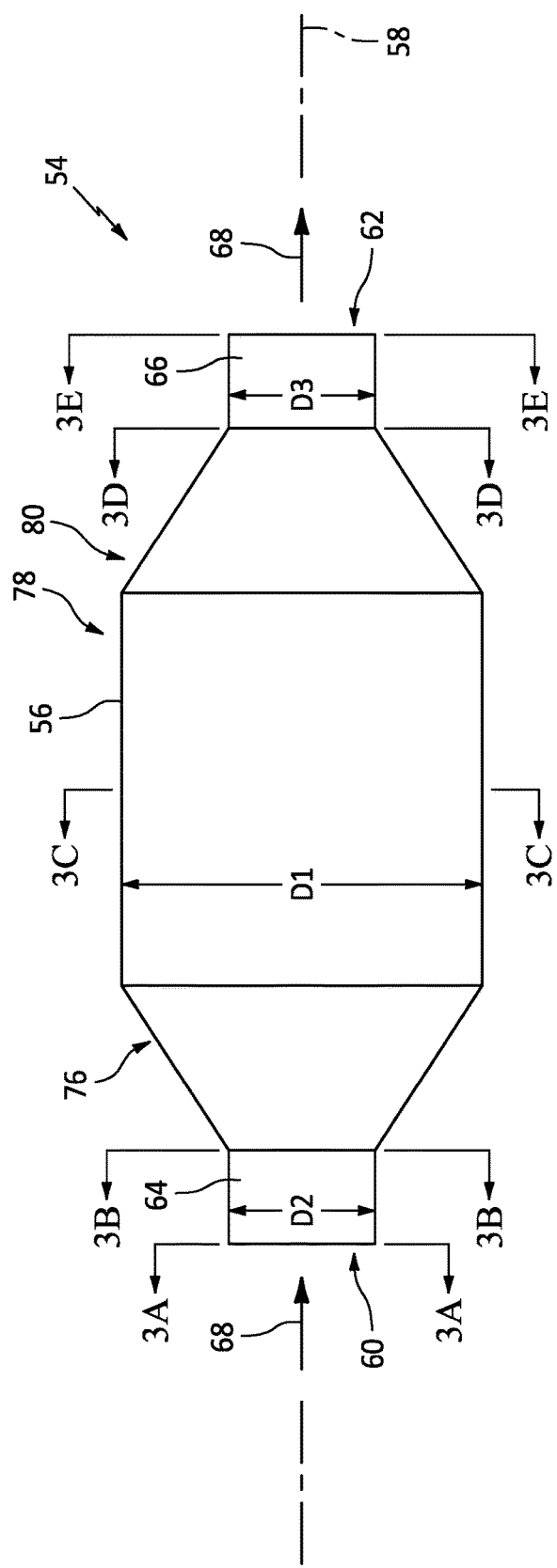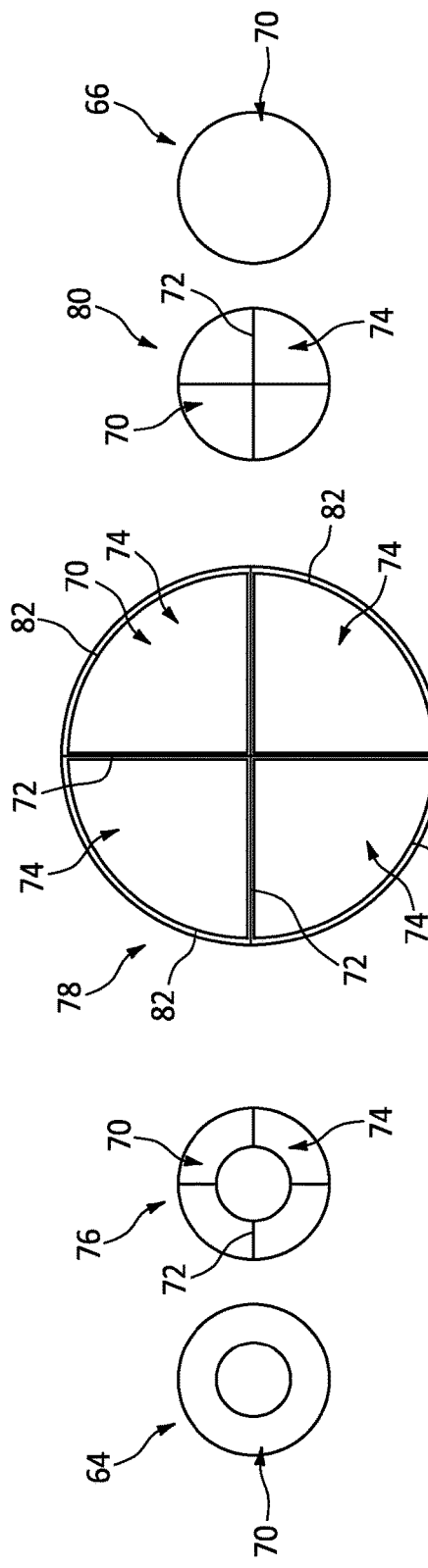
FIG. 2
FIG. 3A  FIG. 3B  FIG. 3C  FIG. 3D  FIG. 3E

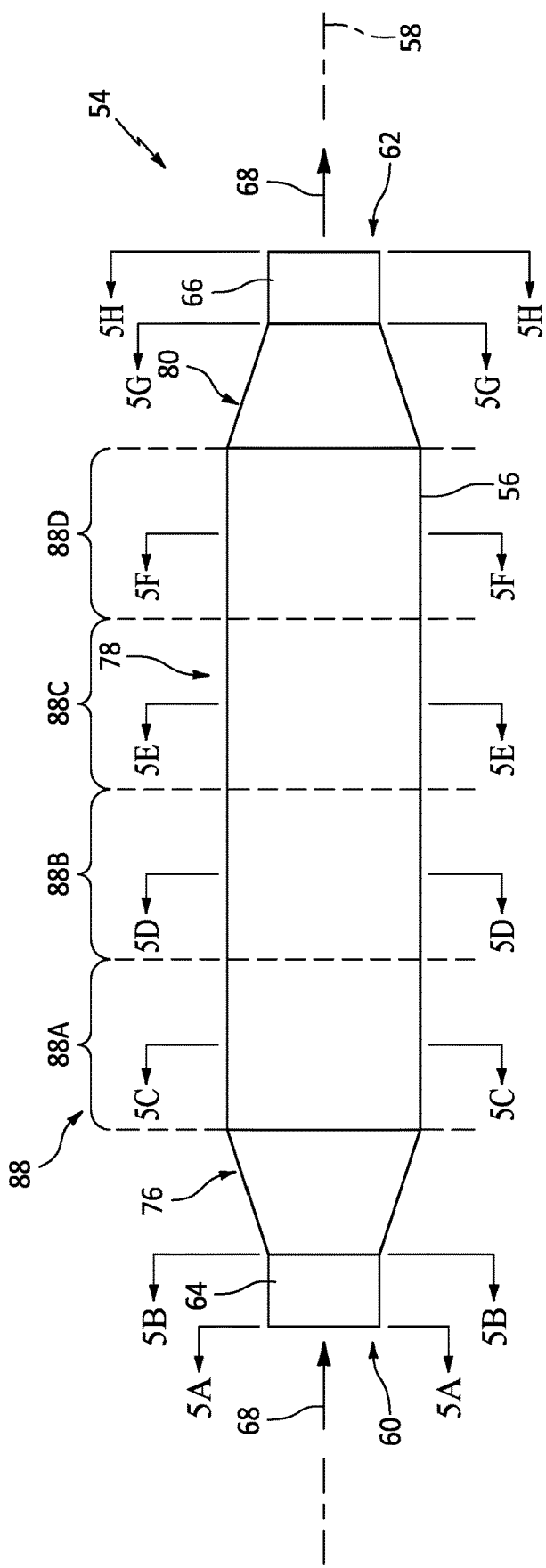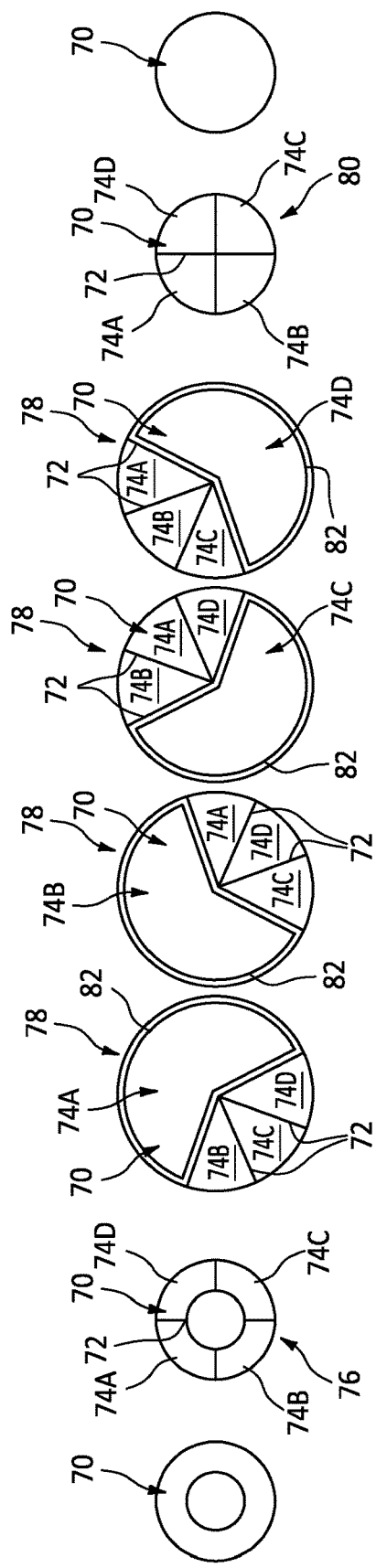
FIG. 4
FIG. 5A  FIG. 5B  FIG. 5C  FIG. 5D  FIG. 5E  FIG. 5F  FIG. 5G  FIG. 5H

DIFFUSER NOZZLE FOR A GAS TURBINE ENGINE

TECHNICAL FIELD

This disclosure relates generally to exhaust nozzles for aircraft gas turbine engines and more particularly to exhaust nozzles configured for treating combustion exhaust gases of aircraft gas turbine engines.

BACKGROUND OF THE ART

It is generally known in the art to power aircraft gas turbine engines with gases expelled from combustion chambers. In the gas turbine engine, a fuel is combusted in an oxygen rich environment. The fuel may be any appropriate fuel such as a liquid or gas. Exemplary fuels include hydrocarbons (for example methane or kerosene) or hydrogen. These combustion systems may emit undesirable compounds such as water vapor, nitrous oxide compounds ($NO_x$), carbon containing compounds. In some cases, it may be desirable to decrease the emission of various compounds as much as possible so that the selected compounds may not enter the atmosphere. There is a need in the art, therefore, for improved systems and methods for treating combustion gas emissions from aircraft gas turbine engines.

SUMMARY

It should be understood that any or all of the features or embodiments described herein can be used or combined in any combination with each and every other feature or embodiment described herein unless expressly noted otherwise.

According to an aspect of the present disclosure, a diffuser nozzle for a gas turbine engine includes a housing disposed about a nozzle axis and extending between a first nozzle end and a second nozzle end. The housing includes a nozzle inlet located at the first nozzle end and a nozzle outlet located at the second nozzle end. The housing defines a nozzle duct extending from the nozzle inlet to the nozzle outlet. A plurality of walls is disposed within the nozzle duct. The plurality of walls subdivides the nozzle duct into a plurality of duct sections with each duct section of the plurality of duct sections extending from the nozzle inlet to the nozzle outlet and having a duct-cross-sectional area. The plurality of walls further defines a plurality of axially-extending duct segments of the nozzle duct such that within a first axially-extending duct segment of the plurality of axially-extending duct segments, the duct cross-sectional area of a first duct section of the plurality of duct sections is greater than the duct cross-sectional area of each other duct section of the plurality of duct sections and within a second axially-extending duct segment of the plurality of axially-extending duct segments, the duct cross-sectional area of a second duct section of the plurality of duct sections is greater than the duct cross-sectional area of each other duct section of the plurality of duct sections.

In any of the aspects or embodiments described above and herein, within the first axially-extending duct segment, the duct cross-sectional area of the first duct section may be greater than a first combined duct cross-sectional area of all of the other duct section of the plurality of duct sections and within the second axially-extending duct segment, the duct cross-sectional area of the second duct section may be greater than a second combined duct cross-sectional area of each other duct section of the plurality of duct sections.

In any of the aspects or embodiments described above and herein, a first number of duct sections of the plurality of duct sections may be equal to a second number of axially-extending duct segments of the plurality of axially-extending duct segments.

In any of the aspects or embodiments described above and herein, the first duct section may include a first exhaust treatment system in only the first axially-extending duct segment and the second duct section may include a second exhaust treatment system in only the second axially-extending duct segment.

In any of the aspects or embodiments described above and herein, wherein each of the first exhaust treatment system and the second exhaust treatment system are configured to remove one or more of water vapor, carbon compounds, or nitrogen oxides ($NO_x$) from an exhaust gas stream passing through the diffuser nozzle.

In any of the aspects or embodiments described above and herein, each axially-extending duct segment of the plurality of axially-extending duct segment may include a total cross-sectional area of the nozzle duct.

In any of the aspects or embodiments described above and herein, each axially-extending duct segment of the plurality of axially-extending duct segments may be located in a first axial portion of the housing and wherein a first diameter of the housing in the first axial portion may be greater than a second diameter of the nozzle inlet and a third diameter of the nozzle outlet.

In any of the aspects or embodiments described above and herein, the housing may further include a second axial portion of the housing positioned between the nozzle inlet and the first axial portion. The second axial portion may have a diffusion diameter which transitions from the second diameter to the first diameter in an axial direction.

In any of the aspects or embodiments described above and herein, the housing may further include a third axial portion of the housing positioned between the nozzle outlet and the first axial portion. The third axial portion may have a diffusion diameter which transitions from first diameter to the third diameter in an axial direction.

In any of the aspects or embodiments described above and herein, each duct section of the plurality of duct sections may be fluidly independent of each other duct section of the plurality of duct sections from the nozzle inlet to the nozzle outlet.

According to another aspect of the present disclosure, a gas turbine engine for an aircraft includes a turbine section, a fixed structure surrounding at least a portion of the turbine section, and a diffuser nozzle mounted to the fixed structure downstream of the turbine section and configured to receive an exhaust gas stream from the turbine section. The diffuser nozzle includes a housing disposed about a nozzle axis and extending between a first nozzle end and a second nozzle end. The housing includes a nozzle inlet located at the first nozzle end and a nozzle outlet located at the second nozzle end. The housing defines a nozzle duct extending from the nozzle inlet to the nozzle outlet. A plurality of walls is disposed within the nozzle duct. The plurality of walls subdivides the nozzle duct into a plurality of duct sections with each duct section of the plurality of duct sections extending from the nozzle inlet to the nozzle outlet and having a duct-cross-sectional area. The plurality of walls further defines a plurality of axially-extending duct segments of the nozzle duct such that within a first axially-extending duct segment of the plurality of axially-extending duct segments, the duct cross-sectional area of a first duct section of the plurality of duct sections is greater than the duct cross-sectional area of each other duct section of the plurality of duct sections and within a second axially-extending duct segment of the plurality of axially-extending duct segments, the duct cross-sectional area of a second duct section of the plurality of duct sections is greater than the duct cross-sectional area of each other duct section of the plurality of duct sections.

In any of the aspects or embodiments described above and herein, the gas turbine engine may be a turboprop or a turboshaft gas turbine engine.

In any of the aspects or embodiments described above and herein, the diffuser nozzle may have a circular cross-sectional shape.

In any of the aspects or embodiments described above and herein, within the first axially-extending duct segment, the duct cross-sectional area of the first duct section may be greater than a first combined duct cross-sectional area of all of the other duct section of the plurality of duct sections and within the second axially-extending duct segment, the duct cross-sectional area of the second duct section may be greater than a second combined duct cross-sectional area of each other duct section of the plurality of duct sections.

In any of the aspects or embodiments described above and herein, a first number of duct sections of the plurality of duct sections may be equal to a second number of axially-extending duct segments of the plurality of axially-extending duct segments.

In any of the aspects or embodiments described above and herein, each axially-extending duct segment of the plurality of axially-extending duct segments may include an exhaust treatment system in only one duct section of the plurality of duct sections.

In any of the aspects or embodiments described above and herein, the exhaust treatment system is configured to remove one or more of water vapor, carbon compounds, or nitrogen oxides ($NO_x$) from the exhaust gas stream passing through the diffuser nozzle.

According to another aspect of the present disclosure, a method for treating exhaust gases from a gas turbine engine for an aircraft includes directing an exhaust gas stream from a turbine section into a nozzle inlet of a diffuser nozzle disposed about a nozzle axis, separating the exhaust gas stream into a plurality of exhaust gas sub-streams with the diffuser nozzle, and sequentially diffusing the plurality of exhaust gas sub-streams with the diffuser nozzle by diffusing and subsequently concentrating each exhaust gas sub-stream of the plurality of exhaust gas sub-streams at an axial location within the diffuser nozzle which is different than other axial locations in which each other exhaust gas sub-stream of the plurality of exhaust gas sub-streams is diffused and subsequently concentrated.

In any of the aspects or embodiments described above and herein, the method may further include directing each exhaust gas sub-stream of the plurality of exhaust gas sub-streams through a respective exhaust treatment system within the diffuser nozzle to remove one or more of water vapor, carbon compounds, or nitrogen oxides ($NO_x$) from each exhaust gas sub-stream.

In any of the aspects or embodiments described above and herein, the respective exhaust treatment system for each exhaust gas sub-stream of the plurality of exhaust gas sub-streams may have a different axial catalyst location than the respective exhaust treatment system for each other exhaust gas sub-stream of the plurality of exhaust gas sub-streams.

The present disclosure, and all its aspects, embodiments and advantages associated therewith will become more readily apparent in view of the detailed description provided below, including the accompanying drawings.

DESCRIPTION OF THE DRAWINGS

FIG. 2 illustrates a side view of a diffuser nozzle for a gas turbine engine, in accordance with one or more embodiments of the present disclosure.

FIGS. 3A-E illustrate various cross-sectional views of the diffuser nozzle of FIG. 2, in accordance with one or more embodiments of the present disclosure.

FIG. 4 illustrates a side view of a diffuser nozzle for a gas turbine engine, in accordance with one or more embodiments of the present disclosure.

FIGS. 5A-H illustrate various cross-sectional views of the diffuser nozzle of FIG. 4, in accordance with one or more embodiments of the present disclosure.

DETAILED DESCRIPTION

Figure 1:
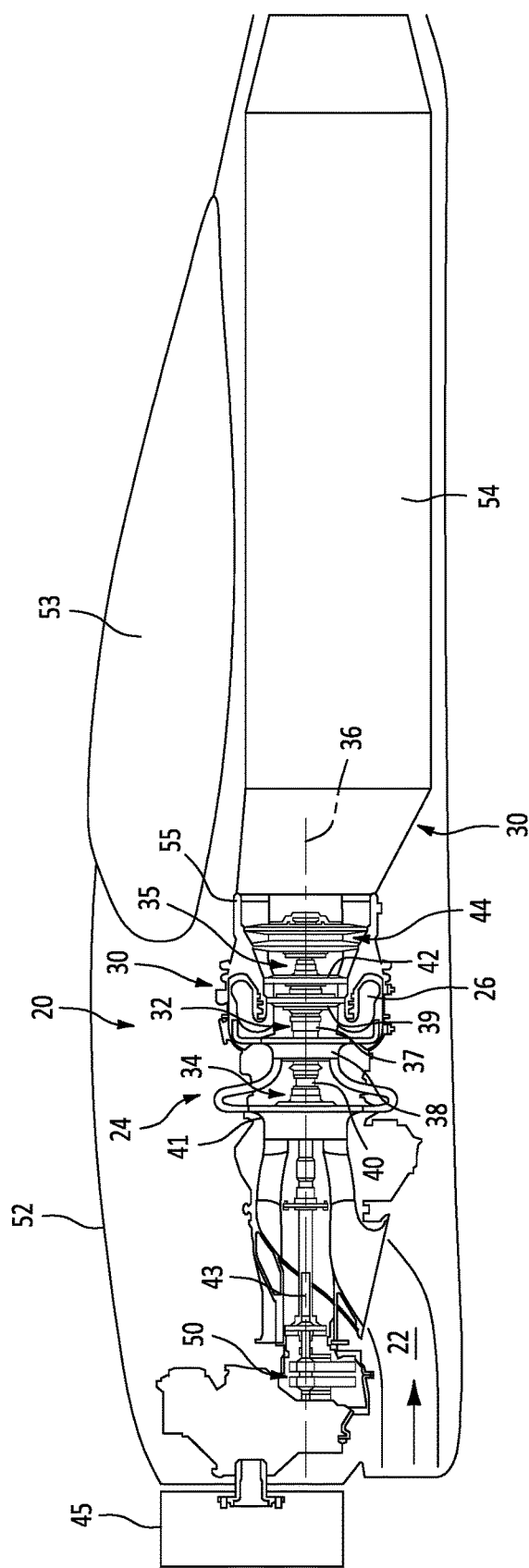
FIG. 1 illustrates a side schematic view of a gas turbine engine including a diffuser nozzle, in accordance with one or more embodiments of the present disclosure.

FIG. 1 illustrates a gas turbine engine 20 of a type preferably provided for use in subsonic flight, generally comprising in serial flow communication an air inlet 22, a compressor section 24 for pressurizing the air from the air inlet 22, a combustor 26 in which the compressed air is mixed with fuel and ignited for generating an annular stream of hot combustion gases, a turbine section 28 for extracting energy from the combustion gases, and an exhaust section 30 through which the combustion exhaust gases exit the gas turbine engine 20.

The gas turbine engine 20 of FIG. 1 generally includes a high-pressure spool 32, a low-pressure spool 34, and a power spool 35 mounted for rotation about an axial centerline 36 (e.g., a rotational axis) of the gas turbine engine 20. The high-pressure spool 32 generally includes a high-pressure shaft 37 that interconnects a high-pressure compressor 38 and a high-pressure turbine 39. The low-pressure spool 34 generally includes a low-pressure shaft 40 that interconnects a low-pressure compressor 41 and a low-pressure turbine 42. The power spool 35 generally includes a drive output shaft 43 in rotational communication with a power turbine 44 having a forward end configured to drive a rotatable load 45. The rotatable load 45 can, for instance, take the form of a propeller. In alternative embodiments, the gas turbine engine 20 may be configured such that the rotatable load 45 may include a rotor, such as a helicopter main rotor, driven by the drive output shaft 43. The drive output shaft 43 may be connected to the rotatable load 45 through a gear assembly 50 to drive the rotatable load 45 at a lower speed than the power spool 35. It should be understood that "low pressure" and "high pressure," or variations thereof, as used herein, are relative terms indicating that the high pressure is greater than the low pressure. The high-pressure shaft 37, the low-pressure shaft 40, and the drive output shaft 43 may be concentric about the axial centerline 36. The gas turbine engine 20 of FIG. 1 further includes a nacelle 52 defining an exterior housing of the gas turbine engine 20. The gas turbine engine 20 of FIG. 1 further includes an aircraft wing 53 mounted to and extending outward from the nacelle 52.

The gas turbine engine 20 of FIG. 1 may be configured, for example, as a turboprop or a turboshaft gas turbine engine. It should be understood that the concepts described herein are not limited to use with turboprops as the teachings may be applied to other types of gas turbine engines such as turbofan gas turbine engines as well as those gas turbine engines including single-spool or two-spool architectures.

The present disclosure gas turbine engine 20 further includes a diffuser nozzle 54 in the exhaust section 30 of the gas turbine engine 20. The diffuser nozzle 54 is configured for post-combustion treatment of combustion exhaust gases, for example, to reduce or otherwise mitigate the emission of undesirable compounds from the gas turbine engine 20. In particular, the diffuser nozzle 54 is configured to reduce the velocity of combustion exhaust gases passing therethrough in order to increase the effectiveness of an exhaust treatment process, as will be discussed in further detail. The gas turbine engine 20 may include a fixed structure 55 such as a casing or cowl surrounding at least a portion of the turbine section 28. The diffuser nozzle 54 may be mounted to the fixed structure 55 axially downstream of the turbine section 28. As shown in FIG. 1, the diffuser nozzle 54 may be located within the nacelle 52 surrounding the gas turbine engine 20. Aspects of the present disclosure diffuser nozzle 54 maybe particularly relevant for the treatment of combustion exhaust gases from turboprop or turboshaft gas turbine engines, as the combustion exhaust gases in these gas turbine engines may not be used to generate a substantial amount of thrust for an associated aircraft. Accordingly, treatment of the combustion exhaust gases according to the present disclosure may provide a valuable means of controlling gas turbine engine emissions without restricting the operational capacity of the associated gas turbine engine. However, it should be understood that aspects of the present disclosure may also be relevant to other types of aircraft gas turbine engines such as turbofan and turbojet gas turbine engines.

Referring to FIGS. 2 and 3A-E, in a first embodiment of the present disclosure, the diffuser nozzle 54 includes a housing 56 disposed about a nozzle axis 58 and extending between a first nozzle end 60 and a second nozzle end 62. The nozzle axis 58 may or may not be colinear with the axial centerline 36 of the gas turbine engine 20. The housing 56 includes a nozzle inlet 64 located at the first nozzle end 60 and a nozzle outlet 66 located at the second nozzle end 62. Combustion exhaust gases (schematically illustrated in FIGS. 2 and 4 as exhaust gas stream 68) are directed from the turbine section 28 to the nozzle inlet 64 and then through the diffuser nozzle 54 in a direction from the nozzle inlet 64 to the nozzle outlet 66. The housing 56 radially surrounds and defines a nozzle duct 70 of the diffuser nozzle 54 extending from the nozzle inlet 64 to the nozzle outlet 66 and including the nozzle inlet 64 and the nozzle outlet 66. While diffuser nozzle 54 is shown in FIGS. 3A-E as having a circular cross-sectional shape, the present disclosure is not limited to this particular cross-sectional shape and other shapes (e.g., polygonal cross-sectional shapes) for the diffuser nozzle 54 may also be used.

The diffuser nozzle 54 may include a plurality of walls 72 disposed within the nozzle duct 70 and extending along at least a portion of the axial span of the diffuser nozzle 54. The plurality of walls 72 may subdivide the nozzle duct 70 into a plurality of duct sections 74 with each duct section 74 extending from the nozzle inlet 64 to the nozzle outlet 66. Each duct section 74 may be fluidly independent of each other duct section 74 from the nozzle inlet 64 to the nozzle outlet 66. In other words, the plurality of walls 72 may isolate each duct section 74 from each other duct section 74, with respect to the combustion exhaust gases passing therethrough, from the nozzle inlet 64 to the nozzle outlet 66. Accordingly, the diffuser nozzle 54 may separate the exhaust gas stream 68 into a plurality of exhaust gas sub-streams with each exhaust gas sub-stream flowing through a respective duct section of the plurality of duct sections 74. As shown in FIGS. 3A-E, the nozzle duct 70 includes a first duct section 74A, a second duct section 74B, a third duct section 74C, and a fourth duct section 74D. However, the present disclosure is not limited to any particular number of duct sections of the plurality of duct sections 74.

Each duct section 74 has a duct cross-sectional area which may vary through an axial span of each duct section 74 from the nozzle inlet 64 to the nozzle outlet 66. FIGS. 3A-E illustrate duct cross-sectional areas of the plurality of ducts 74 at various axial positions of the diffuser nozzle 54. In an upstream-to-downstream direction as shown in FIG. 2, the diffuser nozzle 54 may include the nozzle inlet 64 (see FIG. 3A), a diffusing axial portion 76 (see FIG. 3B), a treatment axial portion 78 (see FIG. 3C), a concentrating axial portion 80 (see FIG. 3D), and the nozzle outlet 66 (see FIG. 3E). The treatment axial portion 78 includes a maximum cross-sectional area of the nozzle duct 70. A diameter D1 of the housing 56 along the treatment axial portion 78 is greater than a diameter D2 of the housing 56 at the nozzle inlet 64 and a diameter D3 of the housing 56 at the nozzle outlet 66. Within the diffusing axial portion 76, the duct cross-sectional area of each duct section 74 gradually increases until reaching a maximum duct cross-sectional area within the treatment axial portion 78. Within the concentrating axial portion 78, the duct cross-sectional area of each duct section 74 gradually decreases from the maximum duct cross-sectional area of the treatment axial portion 78 until reaching the nozzle outlet 66.

In some embodiments, the diffuser nozzle 54 may include an exhaust treatment system 82 in the treatment axial portion 78 of the diffuser nozzle 54. The exhaust treatment system 82 may be configured to treat combustion exhaust gases from the gas turbine engine 20 so as to eliminate or reduce the quantity of one or more compounds within the combustion exhaust gases. Additionally or alternatively, the exhaust treatment system 82 may be configured to alter the physical properties (e.g., pressure, temperature, velocity, etc.) of the exhaust gas stream 68 passing therethrough. In some embodiments, the exhaust treatment system 82 may include a heat exchanger or condenser configured to reduce an amount of water or other fluid vapors in the combustion exhaust gases, for example, minimize or eliminate the formation of condensation trails (i.e., contrails) formed from operation of the gas turbine engine 20. In some embodiments, the exhaust treatment system 82 may additionally or alternatively be configured to absorb or capture carbon containing compounds (e.g., carbon dioxide ($CO_2$)) from the combustion exhaust gases. In some embodiments, the exhaust treatment system 82 may additionally or alternatively be configured to reduce the concentration of air pollutants such as, but not limited to, nitrogen oxides ($NO_x$) from the combustion exhaust gases. For example, the exhaust treatment system 82 may include a monolithic catalyst structure configured for the treatment of $NO_x$ within the combustion exhaust gases. The present disclosure, however, is not limited to any particular form or configuration of exhaust treatment system 82 for the diffuser nozzle 54.

Combustion exhaust gases of the exhaust gas stream 68 passing through the diffuser nozzle 54 are directed through the exhaust treatment system 82 where the exhaust gas stream 68 is treated. Diffusion of the exhaust gas stream 68 within the diffusing axial portion 76 of the diffuser nozzle 54 from the nozzle inlet 64 to the maximum cross-sectional area provided by the treatment axial portion 78 provides for an increase in the static pressure of the exhaust gas stream 68 and a reduction in velocity of the exhaust gas stream 68, within the treatment axial portion 78 of the diffuser nozzle 54. By reducing the velocity of the exhaust gas stream 68 within the treatment axial portion 78, the length of time for interaction of the exhaust gas stream 68 with the exhaust treatment system 82 is increased, thereby improving post-combustion treatment of the exhaust gas stream 68. Moreover, pressure losses of the exhaust gas stream 68 passing through the diffuser nozzle 54 may be reduced in comparison to at least some conventional exhaust systems. Concentration of the exhaust gas stream 68 within the concentrating axial portion 80 of the diffuser nozzle 54 from the treatment axial portion 78 to the nozzle outlet 66 provides for a decrease in the static pressure of the exhaust gas stream 68 and an increase in velocity of the exhaust gas stream 68 which exits the nozzle outlet 66 of the diffuser nozzle 54, thereby providing some amount of usable thrust. Accordingly, the configuration of the diffuser nozzle 54 may provide a tradeoff whereby an axial length of the diffuser nozzle 54 may be decreased and a diameter of the diffuser nozzle 54 (e.g., the diameter D1 of the housing 56 along the treatment axial portion 78) may be increased, while maintaining the post-combustion treatment capability of the diffuser nozzle 54 with respect to the exhaust gas stream 68. The diffuser nozzle 54 may, therefore, provide a form factor which can more readily be incorporated into gas turbine engines such as the gas turbine engine 20 and, for example, be retained within a nacelle for the respective gas turbine engine.

Referring to FIGS. 4 and 5A-H, in a second embodiment of the present disclosure, the diffuser nozzle 54 includes the plurality of duct sections 74 and the cross-sectional area of each duct section 74 of the plurality of duct sections 74 may vary relative to one or more other duct sections 74 of the plurality of duct sections 74 at one or more axial positions within the diffuser nozzle 54. The diffuser nozzle 54 illustrated in FIGS. 4 and 5A-H includes components which are similar to components of the diffuser nozzle 54 illustrated in FIGS. 2 and 3A-E. For the sake of brevity, descriptions of these similar components will not be repeated with respect to the diffuser nozzle 54 illustrated in FIGS. 4 and 5A-H.

As shown in FIGS. 4 and 5A-H, the treatment axial portion 78 of the diffuser nozzle 54 may include a plurality of axially-extending duct segments 88 of the nozzle duct 70. A number of duct sections in the plurality of duct sections 74 is equal to a number of axially-extending duct segments of the plurality of duct segments 88. As shown in FIGS. 5A-H, the nozzle duct 70 includes the first duct section 74A, the second duct section 74B, the third duct section 74C, and the fourth duct section 74D. As shown in FIGS. 4 and 5A-H, the treatment axial portion 78 of the diffuser nozzle 54 includes a first axially-extending duct segment 88A, a second axially-extending duct segment 88B, a third axially-extending duct segment 88C, and a fourth axially-extending duct segment 88D. However, the present disclosure is not limited to any particular number of duct sections 74 of the plurality of duct sections 74 or axially-extending duct segments 88 of the plurality of axially-extending duct segments 88. Each axially-extending duct segment of the plurality of axially-extending duct segments 88 includes the duct cross-sectional area of each duct section 74 of the plurality of duct sections 74 located axially therein. In other words, each axially-extending duct segment 88 of the plurality of axially-extending duct segments 88 includes a total cross-sectional area of the nozzle duct 70 within each respective axially-extending duct segment 88 of the plurality of axially-extending duct segments 88.

Within the nozzle duct 70, the plurality of walls 72 may be configured to provide for axially staggered diffusion of each of the duct sections 74 of the plurality of duct sections 74. In each axially-extending duct segment 88 of the plurality of axially-extending duct segments 88, one duct section 74 of the plurality of duct sections 74 may have a duct cross-sectional area which is greater than the duct cross-sectional area of each other duct section 74 of the plurality of duct sections 74. Each other duct section 74 of the plurality of duct sections 74 may have duct cross-sectional areas which are substantially equal to one another. In each axially-extending duct segment 88 of the plurality of axially-extending duct segments 88, the duct section 74 having the greater duct cross-sectional area may be different than the duct section 74 having the greater duct cross-sectional area in each other axially-extending duct segment 88 of the plurality of axially-extending duct segments 88. In some embodiments, in each axially-extending duct segment 88 of the plurality of axially-extending duct segments 88, one duct section 74 of the plurality of duct sections 74 may have a duct cross-sectional area which is greater than all of the duct cross-sectional areas of each other duct section 74 (i.e., the combined duct cross-sectional area of each other duct section 74) of the plurality of duct sections 74. The staggered diffusion configuration of the present disclosure diffuser nozzle of FIGS. 4 and 5A-H may provide a tradeoff whereby a diameter of the diffuser nozzle 54 is decreases and an axial length of the diffuser nozzle 54 is increase, with respect to the diffuser nozzle 54 of FIGS. 2 and 3A-E, while maintaining the post-combustion treatment capability of the diffuser nozzle 54 with respect to the exhaust gas stream 68. The diffuser nozzle 54 may, therefore, provide a form factor which can more readily be incorporated into gas turbine engines such as the gas turbine engine 20 and, for example, be retained within a nacelle for the respective gas turbine engine.

While each of the axially-extending duct segments 88 of the plurality of axially-extending duct segments 88 are illustrated in FIG. 4 has having a substantially equal axial length, it should be understood that the present disclosure is not limited to any particular axial lengths for the plurality of axially-extending duct segments 88. In some embodiments, the axial lengths of the plurality of axially-extending duct segments 88 may be varied relative to one another, for example, to account for changes in pressure and/or velocity of the exhaust gas stream 68 as the exhaust gas stream 68 passes through the nozzle duct 70 from the nozzle inlet 64 to the nozzle outlet 66.

In the first axially-extending duct segment 88A, the first duct section 74A has a duct cross-sectional area that gradually expands, relative to the duct sections 74B, 74C, 74D, to a maximum duct cross-sectional area (see, e.g., FIG. 5C) which is greater than each of the duct cross-sectional areas of the duct sections 74B, 74C, 74D. The duct cross-sectional area of the first duct section 74A subsequently gradually contracts relative to the duct sections 74B, 74C, 74D within the first axially-extending duct segment 88A. In the second axially-extending duct segment 88B, the second duct section 74B has a duct cross-sectional area that gradually expands, relative to the duct sections 74A, 74C, 74D, to a maximum duct cross-sectional area (see, e.g., FIG. 5D) which is greater than each of the duct cross-sectional areas of the duct sections 74A, 74C, 74D. The duct cross-sectional area of the second duct section 74B subsequently gradually contracts relative to the duct sections 74A, 74C, 74D within the second axially-extending duct segment 88B. In the third axially-extending duct segment 88C, the third duct section 74C has a duct cross-sectional area that gradually expands, relative to the duct sections 74A, 74B, 74D, to a maximum duct cross-sectional area (see, e.g., FIG. 5E) which is greater than each of the duct cross-sectional areas of the duct sections 74A, 74B, 74D. The duct cross-sectional area of the third duct section 74C subsequently gradually contracts relative to the duct sections 74A, 74B, 74D within the third axially-extending duct segment 88C. In the fourth axially-extending duct segment 88D, the fourth duct section 74D has a duct cross-sectional area that gradually expands, relative to the duct sections 74A, 74B, 74C, to a maximum duct cross-sectional area (see, e.g., FIG. 5F) which is greater than each of the duct cross-sectional areas of the duct sections 74A, 74B, 74C. The duct cross-sectional area of the fourth duct section 74D subsequently gradually contracts relative to the duct sections 74A, 74B, 74C within the fourth axially-extending duct segment 88D. The shapes of the duct cross-sectional areas shown in FIGS. 5C-F are exemplary and the present disclosure is not limited to any particular cross-sectional shape of the plurality of duct sections 74 or the nozzle duct 70. Accordingly, exhaust gas sub-streams of the exhaust gas stream 68 passing through the duct sections 74A-D are sequentially diffused by diffusing and subsequently concentrating each exhaust gas sub-stream associated with each respective duct section 74A-D.

In some embodiments, each duct section 74 of the plurality of duct sections 74 may include the exhaust treatment system 82 at an axial location which is different than an axial location of the exhaust treatment system 82 located in each other duct section 74 of the plurality of duct sections 74. Referring again to FIGS. 4 and 5C-F, for example, the first duct section 74A may include the exhaust treatment system 82 only within the first axially-extending duct segment 88A (e.g., at a location of the maximum duct cross-sectional area of the first duct section 74A). Similarly, duct sections 74B-D may include the exhaust treatment system 82 only within the respective axially-extending duct segments 88B-D. Accordingly, the cross-sectional area of the exhaust treatment system 82 may be optimized for each duct section 74 of the plurality of duct sections 74. It should be understood, however, that the present disclosure is not limited to any particular axial location for the exhaust treatment system 82 within the nozzle duct 70 or within the various duct sections 74 of the plurality of duct sections 74.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A diffuser nozzle for a gas turbine engine, the diffuser nozzle comprising:

a housing disposed about a nozzle axis and extending between a first nozzle end and a second nozzle end, the housing comprising a nozzle inlet located at the first nozzle end and a nozzle outlet located at the second nozzle end, the housing defining a nozzle duct extending from the nozzle inlet to the nozzle outlet; and a plurality of walls disposed within the nozzle duct, the plurality of walls subdividing the nozzle duct into a plurality of duct sections with each duct section of the plurality of duct sections extending from the nozzle inlet to the nozzle outlet and having a duct cross-sectional area, the plurality of walls further defining a plurality of axially-extending duct segments of the nozzle duct, within a first axially-extending duct segment of the plurality of axially-extending duct segments, the duct cross-sectional area of a first duct section of the plurality of duct sections is greater than the duct cross-sectional area of each other duct section of the plurality of duct sections, and within a second axially-extending duct segment of the plurality of axially-extending duct segments, the duct cross-sectional area of a second duct section of the plurality of duct sections is greater than the duct cross-sectional area of each other duct section of the plurality of duct sections.

2. The diffuser nozzle of claim 1, wherein:
within the first axially-extending duct segment, the duct cross-sectional area of the first duct section is greater than a first combined duct cross-sectional area of all of the other duct section of the plurality of duct sections, and
within the second axially-extending duct segment, the duct cross-sectional area of the second duct section is greater than a second combined duct cross-sectional area of each other duct section of the plurality of duct sections.

3. The diffuser nozzle of claim 1, wherein a first number of duct sections of the plurality of duct sections is equal to a second number of axially-extending duct segments of the plurality of axially-extending duct segments.

4. The diffuser nozzle of claim 1, wherein the first duct section includes a first exhaust treatment system in only the first axially-extending duct segment and the second duct section includes a second exhaust treatment system in only the second axially-extending duct segment.

5. The diffuser nozzle of claim 4, wherein each of the first exhaust treatment system and the second exhaust treatment system are configured to remove one or more of water vapor, carbon compounds, or nitrogen oxides ($NO_x$) from an exhaust gas stream passing through the diffuser nozzle.

6. The diffuser nozzle of claim 1, wherein each axially-extending duct segment of the plurality of axially-extending duct segment includes a total cross-sectional area of the nozzle duct.

7. The diffuser nozzle of claim 1, wherein each axially-extending duct segment of the plurality of axially-extending duct segments is located in a first axial portion of the housing and wherein a first diameter of the housing in the first axial portion is greater than a second diameter of the nozzle inlet and a third diameter of the nozzle outlet.

8. The diffuser nozzle of claim 7, wherein the housing further includes a second axial portion of the housing positioned between the nozzle inlet and the first axial portion, the second axial portion having a diffusion diameter which transitions from the second diameter to the first diameter in an axial direction.

9. The diffuser nozzle of claim 7, wherein the housing further includes a third axial portion of the housing positioned between the nozzle outlet and the first axial portion, the third axial portion having a diffusion diameter which transitions from first diameter to the third diameter in an axial direction.

10. The diffuser nozzle of claim 1, wherein each duct section of the plurality of duct sections is fluidly independent of each other duct section of the plurality of duct sections from the nozzle inlet to the nozzle outlet.

11. A gas turbine engine for an aircraft, the gas turbine engine comprising:
a turbine section;
a fixed structure surrounding at least a portion of the turbine section; and
a diffuser nozzle mounted to the fixed structure downstream of the turbine section, the diffuser nozzle including a nozzle inlet fluidly connected to an outlet of the turbine section to receive an exhaust gas stream from the turbine section, the diffuser nozzle comprising:
a housing disposed about a nozzle axis and extending between a first nozzle end and a second nozzle end, the housing comprising the nozzle inlet located at the first nozzle end and a nozzle outlet located at the second nozzle end, the housing defining a nozzle duct extending from the nozzle inlet to the nozzle outlet; and
a plurality of walls disposed within the nozzle duct, the plurality of walls subdividing the nozzle duct into a plurality of duct sections with each duct section of the plurality of duct sections extending from the nozzle inlet to the nozzle outlet and having a duct cross-sectional area, the plurality of walls further defining a plurality of axially-extending duct segments of the nozzle duct,
within a first axially-extending duct segment of the plurality of axially-extending duct segments, the duct cross-sectional area of a first duct section of the plurality of duct sections is greater than the duct cross-sectional area of each other duct section of the plurality of duct sections, and
within a second axially-extending duct segment of the plurality of axially-extending duct segments, the duct cross-sectional area of a second duct section of the plurality of duct sections is greater than the duct cross-sectional area of each other duct section of the plurality of duct sections.

12. The gas turbine engine of claim 11, wherein the gas turbine engine is a turboprop or a turboshaft gas turbine engine.

13. The gas turbine engine of claim 11, wherein the diffuser nozzle has a circular cross-sectional shape.

14. The gas turbine engine of claim 11, wherein:
within the first axially-extending duct segment, the duct cross-sectional area of the first duct section is greater than a first combined duct cross-sectional area of all of the other duct section of the plurality of duct sections, and
within the second axially-extending duct segment, the duct cross-sectional area of the second duct section is greater than a second combined duct cross-sectional area of each other duct section of the plurality of duct sections.

15. The gas turbine engine of claim 11, wherein a first number of duct sections of the plurality of duct sections is equal to a second number of axially-extending duct segments of the plurality of axially-extending duct segments.

16. The gas turbine engine of claim 11, wherein each axially-extending duct segment of the plurality of axially-extending duct segments includes an exhaust treatment system in only one duct section of the plurality of duct sections.

17. The gas turbine engine of claim 16, wherein the exhaust treatment system is configured to remove one or more of water vapor, carbon compounds, or nitrogen oxides ($NO_x$) from the exhaust gas stream passing through the diffuser nozzle.

18. A method for treating exhaust gases from a gas turbine engine for an aircraft, the method comprising:
directing an exhaust gas stream from a turbine section into a nozzle inlet of a diffuser nozzle disposed about a nozzle axis, the diffuser nozzle including a housing, the housing extending between a first nozzle end and a second nozzle send, the housing comprising the nozzle inlet located at the first nozzle end and a nozzle outlet located at the second nozzle end, the housing defining a nozzle duct extending from the nozzle inlet to the nozzle outlet, the nozzle duct including a plurality of duct sections with each duct section of the plurality of duct sections extending from the nozzle inlet to the nozzle outlet;

separating the exhaust gas stream into a plurality of exhaust gas sub-streams with the diffuser nozzle, each exhaust gas sub-stream of the plurality of exhaust gas sub-streams directed through a respective duct section of the plurality of duct sections; and sequentially diffusing the plurality of exhaust gas sub-streams with the diffuser nozzle by diffusing and subsequently concentrating each exhaust gas sub-stream of the plurality of exhaust gas sub-streams at an axial location within the diffuser nozzle which is different than other axial locations in which each other exhaust gas sub-stream of the plurality of exhaust gas sub-streams is diffused and subsequently concentrated.

19. The method of claim 18, directing each exhaust gas sub-stream of the plurality of exhaust gas sub-streams through a respective exhaust treatment system within the diffuser nozzle to remove one or more of water vapor, carbon compounds, or nitrogen oxides ($NO_x$) from each exhaust gas sub-stream.

20. The method of claim 19, wherein the respective exhaust treatment system for each exhaust gas sub-stream of the plurality of exhaust gas sub-streams has a different axial treatment location than the respective exhaust treatment system for each other exhaust gas sub-stream of the plurality of exhaust gas sub-streams.

* * * * *